(12) United States Patent
Gingrich et al.

(10) Patent No.: US 8,944,034 B2
(45) Date of Patent: Feb. 3, 2015

(54) DEDICATED EGR CONTROL STRATEGY FOR IMPROVED EGR DISTRIBUTION AND ENGINE PERFORMANCE

(75) Inventors: Jess W. Gingrich, San Antonio, TX (US); Barrett W. Mangold, Atascosa, TX (US); Steven H. Almaraz, Seguin, TX (US)

(73) Assignee: Southwest Research Institute, San Antonio, TX (US)

( * ) Notice: Subject to any disclaimer, the term of this patent is extended or adjusted under 35 U.S.C. 154(b) by 376 days.

(21) Appl. No.: 13/025,901

(22) Filed: Feb. 11, 2011

(65) Prior Publication Data

US 2012/0204844 A1 Aug. 16, 2012

(51) Int. Cl.
*F02B 47/08* (2006.01)
*F02M 25/07* (2006.01)
*F02B 27/02* (2006.01)

(52) U.S. Cl.
CPC ........ *F02M 25/0707* (2013.01); *F02B 27/0215* (2013.01); *F02M 25/0746* (2013.01); *F02M 25/0749* (2013.01); *Y02T 10/121* (2013.01); *Y02T 10/146* (2013.01)
USPC ....... 123/568.11; 123/315; 60/312; 60/605.2; 701/108

(58) Field of Classification Search
CPC ........... F02B 27/0215; F02M 25/0707; F02M 25/0746; F02M 25/0749; F02M 25/0713; Y02T 10/121; Y02T 10/146
USPC .......... 123/568.12, 568.17, 568.11, 315, 565; 60/605.1, 605.2, 278, 288, 279; 701/108
See application file for complete search history.

(56) References Cited

U.S. PATENT DOCUMENTS 3,156,162 A 11/1964 Wallace, et al.
3,303,831 A 2/1967 Sherman
(Continued)

FOREIGN PATENT DOCUMENTS

GB 2110791 11/1982
JP 11247665 9/1999
JP 2011099375 A * 5/2011

OTHER PUBLICATIONS

International Search Report and Written Opinion dated Oct. 2, 2006 issued in International Patent Application No. PCT/US0540483.
(Continued)

*Primary Examiner* — Erick Solis
*Assistant Examiner* — Carl Staubach
(74) *Attorney, Agent, or Firm* — Grossman, Tucker et al (57) ABSTRACT

The present disclosure relates to methods, apparatuses and systems to manage exhaust gas expelled from cylinders of an internal combustion engine. An exemplary system may comprise at least one cylinder of the engine configured to operate as a dedicated exhaust gas recirculation (EGR) cylinder, and wherein substantially all exhaust gas expelled from the dedicated EGR cylinder is recirculated to an intake system of the engine. In one embodiment, the system may include a flow restrictor configured and arranged to restrict a flow of the recirculated exhaust gas to the dedicated EGR cylinder without restricting a flow of the recirculated exhaust gas to the remaining cylinders of the engine. In another embodiment, exhaust gas may be expelled from the dedicated EGR cylinder in pulsations, and the intake system may be configured to reduce an amplitude of the pulsations of the exhaust gas expelled from the dedicated EGR cylinder.

12 Claims, 4 Drawing Sheets

(56) References Cited

U.S. PATENT DOCUMENTS

| | | | |
|---|---|---|---|
| 3,405,679 A | 10/1968 | Norris, et al. | |
| 3,405,697 A | 10/1968 | Marchand | |
| 3,680,534 A | 8/1972 | Chavant | |
| 3,805,752 A | 4/1974 | Cataldo | |
| 3,924,576 A | 12/1975 | Siewert | |
| 3,941,113 A | 3/1976 | Bauelin | |
| 4,108,114 A | 8/1978 | Kosaka et al. | |
| 4,131,095 A * | 12/1978 | Ouchi | 123/58.8 |
| 4,179,892 A | 12/1979 | Heydrich | |
| 5,178,119 A | 1/1993 | Gale | |
| 5,207,714 A | 5/1993 | Hayashi et al. | |
| 5,257,600 A | 11/1993 | Schechter et al. | |
| 5,456,240 A | 10/1995 | Kanesaka | |
| 5,517,976 A | 5/1996 | Bachle et al. | |
| 5,894,726 A * | 4/1999 | Monnier | 60/274 |
| 6,009,709 A * | 1/2000 | Bailey | 60/605.2 |
| 6,138,650 A | 10/2000 | Bailey | |
| 6,216,458 B1 * | 4/2001 | Alger et al. | 60/605.2 |
| 6,286,489 B1 | 9/2001 | Bailey | |
| 6,343,594 B1 | 2/2002 | Koeslin et al. | |
| 6,425,381 B1 | 7/2002 | Rammer | |
| 6,484,702 B1 | 11/2002 | Riley | |
| 6,536,392 B2 | 3/2003 | Widener | |
| 6,609,374 B2 | 8/2003 | Feucht et al. | |
| 6,655,324 B2 | 12/2003 | Cohn et al. | |
| 6,672,292 B2 | 1/2004 | Fischer | |
| 6,742,507 B2 | 6/2004 | Keefer et al. | |
| 6,789,531 B1 | 9/2004 | Remmels | |
| 6,820,415 B2 | 11/2004 | Abet et al. | |
| 6,871,642 B1 | 3/2005 | Osterwald | |
| 6,877,492 B1 | 4/2005 | Osterwald | |
| 6,918,251 B2 * | 7/2005 | Yanagisawa et al. | 60/605.2 |
| 6,945,235 B1 * | 9/2005 | Bertilsson et al. | 123/568.11 |
| 7,028,680 B2 | 4/2006 | Liu et al. | |
| 7,032,578 B2 | 4/2006 | Liu et al. | |
| 7,140,357 B2 | 11/2006 | Wei et al. | |
| 7,290,504 B2 | 11/2007 | Lange | |
| 7,389,770 B2 * | 6/2008 | Bertilsson et al. | 123/568.17 |
| 7,721,541 B2 | 5/2010 | Roberts, Jr. et al. | |
| 7,757,677 B2 * | 7/2010 | Dobrila | 123/568.11 |
| 7,945,376 B2 | 5/2011 | Geyer et al. | |
| 7,945,377 B1 * | 5/2011 | Van Nieuwstadt et al. | 701/108 |
| 8,291,891 B2 * | 10/2012 | Alger et al. | 123/568.11 |
| 8,387,593 B2 * | 3/2013 | Ichihara et al. | 123/568.21 |
| 8,561,599 B2 | 10/2013 | Gingrich et al. | |
| 2002/0189598 A1 | 12/2002 | Remmels et al. | |
| 2003/0121484 A1 | 7/2003 | Wang | |
| 2004/0099256 A1 | 5/2004 | Stewart | |
| 2005/0016792 A1 * | 1/2005 | Graefenstein | 181/253 |
| 2005/0022450 A1 | 2/2005 | Tan et al. | |
| 2006/0112940 A1 | 6/2006 | Roberts et al. | |
| 2007/0028901 A1 * | 2/2007 | Watakabe et al. | 123/568.12 |
| 2007/0193270 A1 | 8/2007 | Roozenboom et al. | |
| 2009/0199825 A1 | 8/2009 | Piper et al. | |
| 2009/0308070 A1 | 12/2009 | Alger, II et al. | |
| 2011/0041495 A1 * | 2/2011 | Yager | 60/605.2 |
| 2012/0167863 A1 | 7/2012 | Kulkarni | |
| 2012/0204845 A1 | 8/2012 | Gingrich et al. | |
| 2012/0216530 A1 | 8/2012 | Flynn et al. | |

OTHER PUBLICATIONS

International Preliminary Report on Patentability dated May 8, 2007 issued in International Patent Application No. PCT/US0540483.

U.S. Office Action dated Mar. 22, 2013 issued in related U.S. Appl. No. 13/025,912.

\* cited by examiner

DEDICATED EGR CONTROL STRATEGY FOR IMPROVED EGR DISTRIBUTION AND ENGINE PERFORMANCE

FIELD OF THE INVENTION

The present disclosure relates to internal combustion engines, and more particularly, to improved exhaust gas recirculation (EGR) for such engines which may be used in motor vehicles.

BACKGROUND

For conventional low level exhaust gas recirculation (EGR), exhaust gas expelled from the cylinders of an internal combustion engine may be collected in a collector of an exhaust manifold. A fraction of the collected exhaust gas (e.g. 5% to 10%) may then be routed from the exhaust manifold through a control valve back to an intake manifold of the engine, where it may be introduced to a stream of ambient air/fuel (A/F) mixture. The remaining fraction of exhaust gas in the exhaust manifold, rather than being recirculated and recycled, generally flows to a catalytic converter of the exhaust system and, after treatment therein, may be expelled to the atmosphere.

EGR has a history of use in both diesel and spark-ignition engines, and affects combustion in several ways. The combustion may be cooled by the presence of exhaust gas, that is, the recirculated exhaust gas may absorb heat. The dilution of the oxygen present in the combustion chamber with the exhaust gas, in combination with the cooler combustion, may reduce the production of mono-nitrogen oxides (NOx), such as nitric oxide (NO) and nitrogen dioxide ($NO_2$). Also, when exhaust gas is recirculated, less air may be breathed by the engine, which may reduce the amount of exhaust gas produced. Additionally, EGR may reduce the need for fuel enrichment at high loads in turbocharged engines and thereby improve fuel economy.

EGR which uses higher levels of exhaust gas may further increase fuel efficiency and reduce emissions of spark-ignition engines. However, with higher levels of exhaust gas, engines may face challenges related to EGR control and tolerance, which may reduce the expected fuel efficiency improvement. Challenges related to EGR control may be understood to include reducing a variability of the exhaust gas, particularly composition and distribution. If a variation in the exhaust gas introduced to an engine is too random, fuel efficiency improvements may suffer. Challenges related to EGR tolerance may be understood to include increasing an engine's ability to process higher levels of exhaust gas without adversely affecting performance, particularly fuel economy. Thus, even if EGR control and tolerance may be satisfactory for engine operation at low levels of EGR, an engine may need additional modifications in structure and operational conditions to accommodate higher levels of EGR without adversely affecting engine performance.

More recently, an engine configuration has been proposed with one or more cylinders of an engine dedicated to expelling exhaust gas for EGR. Such cylinders may be referred to as dedicated EGR, or D-EGR, cylinders. Dedicated EGR cylinder(s) may operate at a broad range of equivalence ratios since their exhaust gas is generally not configured to exit the engine before passing through a cylinder operating at, for example, a stoichiometric or near stoichiometric air/fuel ratio. This may allow the dedicated EGR cylinder to be run rich to produce higher levels of hydrogen ($H_2$) and carbon monoxide (CO) which, may in turn, enhance flame speeds, combustion, and knock tolerance of all the cylinders.

SUMMARY

The present disclosure expands upon the use of engines with one or more dedicated EGR cylinders, by providing configurations of systems, apparatuses and methods to further control an operation of a dedicated EGR cylinder independent of the remaining cylinders, as well as further control the exhaust gas expelled from the dedicated EGR cylinder. For example, for an engine having a dedicated EGR cylinder, configurations of systems, apparatuses and methods are provided to restrict an amount of exhaust gas consumed by the dedicated EGR cylinder without necessarily restricting an amount of exhaust gas consumed by the remaining cylinders. Furthermore, for example, configurations of systems, apparatuses and methods are provided to improve mixing and distribution of dedicated EGR cylinder exhaust gas introduced to a stream of intake air, which may improve EGR control and tolerance.

According to one embodiment of the present disclosure, a method to manage exhaust gas expelled from cylinders of an internal combustion engine is provided, with the method comprising: operating at least one cylinder of the engine as a dedicated exhaust gas recirculation (EGR) cylinder, and wherein substantially all the exhaust gas expelled from the dedicated EGR cylinder is recirculated to an intake system of the engine and the exhaust gas expelled from the dedicated EGR cylinder is expelled in pulsations; introducing the pulsations of the exhaust gas from the dedicated EGR cylinder to a first flow passage and a second flow passage of an intake system; merging the pulsations of the exhaust gas from the first and second flow passages such that the pulsations from the flow passages destructively interfere with one another; and introducing the exhaust gas from the intake system to all the cylinders of the engine.

According to another embodiment of the present disclosure, a method to manage exhaust gas expelled from cylinders of an internal combustion engine is provided, with the method comprising: operating at least one cylinder of the engine as a dedicated exhaust gas recirculation (EGR) cylinder, and wherein substantially all exhaust gas expelled from the dedicated EGR cylinder is recirculated to an intake system of the engine; and controlling a flow of the recirculated exhaust gas during operation of the engine with at least one flow restrictor, wherein the flow restrictor is configured and arranged to restrict the flow of the recirculated exhaust gas to the dedicated EGR cylinder without restricting the flow of the recirculated exhaust gas to the remaining cylinders of the engine.

According to another embodiment of the present disclosure, a system to manage exhaust gas expelled from cylinders of an internal combustion engine is provided, with the system comprising: at least one cylinder of the engine configured to operate as a dedicated exhaust gas recirculation (EGR) cylinder, and wherein substantially all the exhaust gas expelled from the dedicated EGR cylinder is recirculated to an intake system of the engine; and the intake system is configured to reduce an amplitude of the pulsations of the exhaust gas expelled from the dedicated EGR cylinder.

According to another embodiment of the present disclosure, a system to manage exhaust gas expelled from cylinders of an internal combustion engine is provided, with the system comprising: at least one cylinder of the engine configured to operate as a dedicated exhaust gas recirculation (EGR) cylinder, and wherein substantially all exhaust gas expelled from the dedicated EGR cylinder is recirculated to an intake system of the engine, and a flow restrictor configured and arranged to restrict a flow of the recirculated exhaust gas to the dedicated EGR cylinder without restricting a flow of the recirculated exhaust gas to the remaining cylinders of the engine.

FIGURES

The above-mentioned and other features of this disclosure, and the manner of attaining them, will become more apparent and better understood by reference to the following description of embodiments described herein taken in conjunction with the accompanying drawings, wherein.

DETAILED DESCRIPTION

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

The following description is directed to various configurations of exhaust gas recirculation (EGR) systems, apparatuses and methods, to be used with an internal combustion engine. With the EGR configurations, one or more cylinders of the internal combustion engine may be used to generate exhaust gas, which may then be recirculated and mixed with an intake stream of air to provide a mixed charge (mixture) of exhaust gas and air to the cylinders of the engine. For the purposes of this disclosure, an engine configured such that substantially an entire output of exhaust gas from a cylinder is to be recirculated for EGR may be referred to herein as an engine having a dedicated EGR cylinder.

Figure 1:
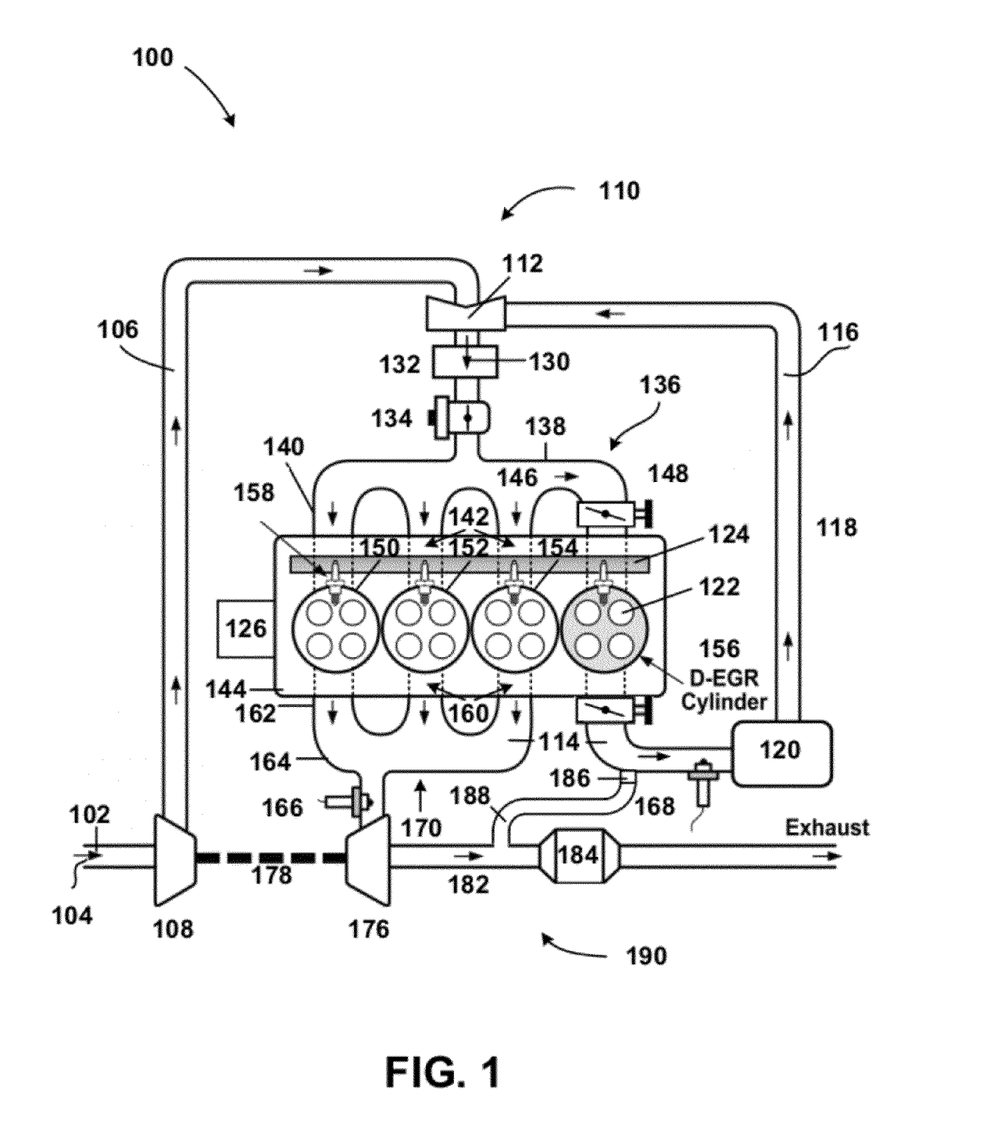
FIG. 1 is a schematic drawing of an inline four cylinder engine with a dedicated exhaust gas recirculation (D-EGR) cylinder, and an exhaust gas recirculation system with a flow restrictor configured and arranged to restrict a flow of recirculated exhaust gas to the dedicated EGR cylinder without restricting the flow of recirculated exhaust gas to the remaining cylinders of the engine.

FIG. 1 illustrates an internal combustion engine 100 having four cylinders 150, 152, 154 and 156. One of the cylinders, cylinder 156, may be understood to be a dedicated EGR cylinder. In other words, it may be understood that substantially all of the exhaust gas expelled from cylinder 156 may be directed (recirculated) back to the intake system 110, here through an EGR feedback loop 118. The exhaust gas from the remaining three cylinders 150, 152, and 154 is directed to an exhaust system 190, with none of the exhaust gas expelled from cylinders 150, 152 and 154 recirculated to the intake system 110 of engine 100.

While it may be possible, based on the configuration of engine 100, for all of the exhaust gas (i.e. 100%) expelled from cylinder 156 to be optimally recirculated back to the intake system 110, it should be understood that certain design considerations and operating inefficiencies may only allow substantially all the exhaust gas expelled from cylinder 156 to be recirculated back to the intake system 110. For example, exhaust gas losses may occur between connection points (e.g. loop 118 and cylinder head 144), or other connection points between separate components. Accordingly, it is contemplated that on a volume basis, 90% or more of the exhaust gas expelled from the dedicated EGR cylinder is recirculated to the engine intake system 110. More preferably, 90-100% of the exhaust gas expelled from cylinder 156 is recirculated, including all values therein, in 0.1% by volume increments.

Furthermore, engine 100 may also be understood to have a maximum "25% dedicated EGR" because the exhaust gas expelled from each cylinder may be understood to have substantially the same volume, and one of the four cylinders has 100% of its exhaust gas redirected to the intake system 110, as noted above.

During an operation of engine 100, ambient intake air 102 may enter air inlet 104 of air intake system 110. The air 102 may then travel within intake passage 106, during which time it may be compressed by compressor 108. Thereafter, air 102 may enter mixer 112 of air intake system 110, which provides an exhaust gas recirculation apparatus configured to distribute and mix recirculated exhaust gas 114 in a stream of air 102 to be introduced to the internal combustion engine 100, particularly statically (with no moving structure).

Also with the operation of engine 100, exhaust gas 114 from dedicated EGR cylinder 156 may enter passage 116 of EGR feedback loop 118. Thereafter, exhaust gas 114 may enter mixer 112 of the air intake system 110 and be mixed with a stream of air 102 to provide a mixture 130 thereof.

Prior to entering mixer 112, one or more components of the exhaust gas 114 may react with water using a water gas shift reaction (WGSR) with a suitable water gas shift (WGS) catalyst 120. With the WGS reaction, carbon monoxide (CO) in the exhaust gas 114 may react with water ($H_2O$) to produce carbon dioxide ($CO_2$) and hydrogen ($H_2$) according to the reaction:

$$CO+H_2O \rightarrow CO_2+H_2$$

Figure 2:
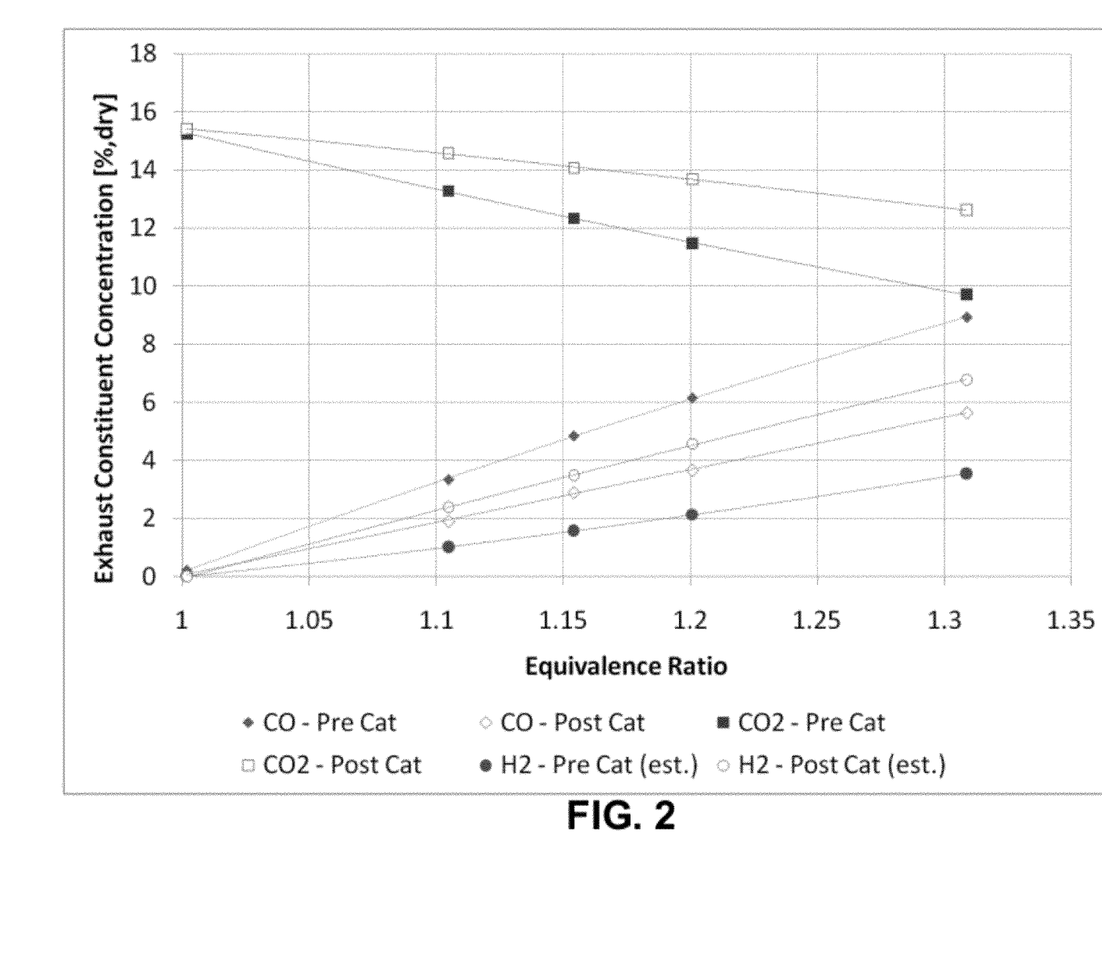
FIG. 2 is a graph showing amounts of various components of exhaust gas at various equivalence ratios before (pre) and after (post) exposure to a water gas shift catalyst and corresponding reaction with water.

Reacting carbon monoxide in the exhaust gas 114 with water to produce hydrogen is beneficial by increasing the amount of hydrogen in the exhaust gas 114 from dedicated EGR cylinder 156. The WGS catalyst 120 performance is highly dependent on exhaust temperature, and the amount of hydrogen exiting the catalyst 120 is dependent on the amount entering and the amount created. The amount of hydrogen entering the catalyst 120 is a function of the dedicated EGR cylinder air/fuel ratio and spark timing. The amount of hydrogen created is dependent on exhaust gas temperature and the amount of carbon monoxide in the inlet exhaust. Both can be manipulated with the dedicated EGR cylinder air/fuel ratio. Therefore, for a given operating condition, the dedicated EGR cylinder air/fuel ratio can be controlled to maximize the amount of $H_2$ exiting the WGS catalyst 120. Examples of WGS catalysts may include iron oxides ($Fe_3O_4$) or other transition metals and transition metal oxides. FIG. 2 provides a graph showing the amounts of various components of exhaust gas at various equivalence ratios before (pre) and after (post) exposure to a water gas shift catalyst and corresponding reaction with water. The equivalence ratio is the actual air-fuel ratio divided by the air-fuel ratio for complete combustion.

After being mixed in mixer 112, air/exhaust gas mixture 130 may then flow in passage 106 to intercooler 132 to remove heat therefrom and correspondingly increase the density thereof. After being cooled by intercooler 132, air/exhaust gas mixture 130 may then flow to an intake flow restrictor 134, such as an intake throttle valve (a mechanism which by which a flow of the air/exhaust gas mixture 130 is managed by restriction or obstruction) configured to restrict the volumetric flow and amount (mass) of air/exhaust gas mixture 130 provided to cylinders 150, 152, 154 and 156. The intake throttle valve may more particularly comprise a butterfly valve that restricts the flow and amount of air/exhaust gas mixture 130 entering the intake manifold 136 and ultimately provided to cylinders 150, 152, 154 and 156. Intake flow restrictor 134 may be considered to be a primary flow restrictor in that it may similarly restrict the flow of the air/exhaust gas mixture 130 to all of cylinders 150, 152, 154 and 156.

Intake flow restrictor 134 may be located at the entrance of intake manifold 136. Intake manifold 136 may comprise a plenum 138 through which the air/exhaust gas mixture 130 may flow to a plurality of intake passages/runners 140, shown with one passage/runner 140 dedicated to each cylinder 150-156. Each passage/runner 140 may then feed the air/exhaust gas mixture 130 directly into an intake port 142 (shown by dotted lines) of a cylinder head 144, shown with one port 142 dedicated to each cylinder 150-156.

After entering cylinders 150-156, the air/exhaust gas mixture 130 may be ignited by igniter 158 (e.g. spark plug) and combust therein. After combustion of the air/exhaust gas mixture 130 within cylinders 150-156, exhaust gas 114 from cylinders 150, 152 and 154 may flow through exhaust ports 160 of cylinder head 144 and exhaust passages/runners 162 of exhaust manifold 170, shown with one exhaust port 160 and one passage/runner 162 dedicated to each cylinder 150-154, and then be collected in collector 164.

From collector 164, exhaust gas 114 may then flow through turbine 176, which may turn compressor 108 by shaft 178. After turbine 176, exhaust gas 114 may flow through exhaust passage 182 to catalytic converter 184 to be treated therein before being expelled from exhaust system 190 and into the atmosphere. Catalytic converter 184 may comprise a three-way catalytic converter. In other words, a catalytic converter which performs the following:

Reduction of Nitrogen Oxides to Nitrogen and Oxygen by the Reaction:

$$2NO_x \rightarrow xO_2 + N_2.$$

Oxidation of Carbon Monoxide to Carbon Dioxide by the Reaction:

$$2CO + O_2 \rightarrow 2CO_2.$$

Oxidation of Unburnt Hydrocarbons (HC) to Carbon Dioxide and Water by the Reaction:

$$C_xH_{2x+2} + [(3x+1)/2]O_2 \rightarrow xCO_2 + (x+1)H_2O.$$

To control the air/fuel ratio, exhaust gas 114 from cylinders 150, 152 and 154 may be sampled by an exhaust gas oxygen (EGO) sensor 166, which may more particularly comprise a heated exhaust gas oxygen (HEGO) sensor, while exhaust gas 114 from cylinder 156 may be sampled by an exhaust gas oxygen (EGO) sensor 168, which may more particularly comprise a universal exhaust gas oxygen (UEGO) sensor.

To control the mass and volumetric flow rate of the air/exhaust gas mixture 130 entering dedicated EGR cylinder 156, the portion of the intake passage 146 dedicated to cylinder 156 may include an intake charge flow restrictor 148, such as a throttle valve, configured and arranged to restrict the flow and amount of air/exhaust gas mixture 130 entering cylinder 156 without restricting the flow and amount of air/exhaust gas mixture 130 entering remaining cylinders 150, 152 or 154. The throttle may more particularly comprise a butterfly valve that restricts the amount of air/exhaust gas mixture 130 entering cylinder 156. Flow restrictor 148 may be considered to be a secondary flow restrictor in that it may restrict the flow of the air/exhaust gas mixture 130 to a particular cylinder, here cylinder 156, as opposed to all the cylinders, after the air/exhaust gas mixture 130 has flowed past primary flow restrictor 134.

As shown in FIG. 1, flow restrictor 148 may be located on the intake side of cylinder 156 for intake restriction, or on the exhaust side of cylinder 156 for exhaust restriction. However, it may be expected that flow restrictor 148 would be better positioned on the intake side of cylinder 156 to reduce back pressure thereon which may be associated with use of flow restrictor 148 on the exhaust side of cylinder 156. When positioned on the intake side of engine 100, flow restrictor 148 may be attached to the intake manifold 136, or arranged between the intake manifold 136 and the cylinder head 144. When positioned on the exhaust side of engine 100, flow restrictor 148 may be attached to the exhaust passage 166, or located between the exhaust passage 116 and the cylinder head 144.

With the foregoing configuration, as flow restrictor 148 may be at least partially closed, the flow and amount of air/exhaust gas mixture 130 entering cylinder 156 may be decreased. Simultaneously, the air/exhaust gas mixture 130 entering cylinders 150, 152 and 154 may be increased, provided flow restrictor 134 remains unchanged. Thus, the flow and amount of the air/exhaust gas mixture 130 entering cylinder 156 may be inversely related to the flow and amount of the air/exhaust gas mixture 130 entering cylinders 150, 152 and 154. That is, as the flow and amount of the air/exhaust gas mixture 130 entering cylinder 156 may be decreased, the flow and amount of the air/exhaust gas mixture 130 entering cylinders 150, 152 and 154 may be increased, and vice-versa.

As indicated above, without the use of flow restrictor 148, the engine 100 in FIG. 1 may be understood to have "25% dedicated EGR" because the exhaust gas expelled from each cylinder 150-156 may be understood to have substantially the same volume, and one of the four cylinders, cylinder 156, has 90-100% by volume of its exhaust gas redirected to the intake manifold 136. However, with the use of flow restrictor 148, the volume of exhaust gas expelled from cylinder 156 may now be varied by restricting the amount of air/exhaust gas 130 which is consumed by cylinder 156 such at the engine 100 may provide, for example, between 0.1% and 25% dedicated EGR. By decreasing the flow and amount of air/exhaust gas 130 which is consumed by cylinder 156, the flow and amount of exhaust gas 114 expelled from cylinder 156 and routed through EGR loop 118 to air intake system 110 may be correspondingly decreased, which will decrease amount of exhaust gas 114 provided to the cylinders 150-156.

Furthermore, flow restrictor 148 may be used in conjunction with valves 122, fuel injector 124 and engine controller 126 of engine 100 to operate or otherwise control dedicated EGR cylinder 156 at the same or different air/fuel ratio than cylinders 150, 152 and 154. Further, each cylinder 150-156 may be independently operated at an air/fuel ratio which is greater than (rich), equal to, or less than (lean) a stiochiometric ratio for the air and fuel.

In the event flow restrictor 148 becomes inoperable, or for other reason there is too much exhaust gas 114 introduced into EGR loop 118, it may be desirable to bleed off a portion of the exhaust gas 114 from EGR loop 118. As shown, the EGR loop 118 may be equipped with a bleeder valve 186 which may, upon reaching a predetermined pressure, bleed off excess exhaust gas 114 from cylinder 156 to bypass passage 188 which removes exhaust gas 114 from EGR loop 118. In the foregoing manner, bleeder valve 186 may provide another means other than flow restrictor 148 to control the EGR mass flow back to the intake. Bypass passage 188 may then feed the exhaust gas into exhaust passage 182 prior to catalytic converter 184 to be treated therein before being expelled from exhaust system 190 and into the atmosphere.

If dedicated EGR cylinder 156 is run rich of stoichiometric A/F ratio, a relatively significant amount of hydrogen ($H_2$) and carbon monoxide (CO) may be formed, both of which may promote increased EGR tolerance by increasing burn rates, increasing the dilution limits of the mixture and reducing quench distances. In addition, the engine 100 may perform better at knock limited conditions, such as improving low speed peak torque results, due to increased EGR tolerance and the knock resistance provided by hydrogen ($H_2$) and carbon monoxide (CO). Also, if exhaust gas 114 from one or more cylinders 156 is redirected to the intake manifold 136, and the cylinder 156 is run at rich of stoichiometric A/F ratios (i.e. Phi($\Phi$)>1.0), the EGR tolerance of the engine 100 may now increase while the overall fuel consumption may decrease.

It therefore may now be appreciated that in one exemplary embodiment the present disclosure provides methods and systems to manage exhaust gas 114 expelled from cylinders 150-156 of an internal combustion engine 100, with the method comprising operating at least one cylinder of the engine 100 as a dedicated exhaust gas recirculation (EGR) cylinder 156, and wherein substantially all exhaust gas 114 expelled from the dedicated EGR cylinder 156 is recirculated to an intake system 110 of the engine 100, and controlling a flow of the recirculated exhaust gas 114 during operation of the engine 100 with at least one flow restrictor 148, wherein the flow restrictor 148 is configured and arranged to restrict a flow of the recirculated exhaust gas 114 to the dedicated EGR cylinder 156 without restricting a flow of the recirculated exhaust gas 114 to the remaining cylinders 150, 152 and 154 of the engine 100.

In addition to the above it may now be mentioned that flow restrictor 148, alone or in conjunction with an ability to control cylinder spark timing independently, may be further employed to balance a power output and combustion phasing of the dedicated EGR cylinder 156 with the remaining cylinders 150, 152 and 154. This may then inhibit torque imbalances on a crankshaft of the engine. Moreover, other techniques which may be used to alter the percentage of EGR for engine 100 having a dedicated EGR cylinder 156 (by changing the mass flow through the dedicated EGR cylinder 156 relative to the other cylinders 150, 152 and 154) may include dedicated EGR intake or exhaust valve phasing, as well as changes to the dedicated EGR cylinder bore, stroke, and compression ratio in comparison to the other cylinders.

Due to dedicated EGR cylinder 156 being the only cylinder expelling exhaust gas 114 which is recirculated to intake system 110 of engine 100, the exhaust gas 114 may be recirculated to intake system 110 in pulsations, rather than a continuous flow. A pulsation may be understood as an increase in exhaust gas flow and associated pressure relative to some baseline condition. For example, during the operation of engine 100, cylinder 156 may be understood to expel exhaust gas 114 during the exhaust stroke thereof, but not during the intake, compression and combustion strokes. Thus, since cylinder 156 may expel exhaust gas 114 during one of its four strokes, the exhaust gas 114 may be expelled in pulsations occurring with the exhaust stroke. More particularly, the engine 100 may experience pulsed exhaust gas 114 flow due to the valve events of the dedicated EGR cylinder 156 and dynamic pressure wave reflections in the dedicated EGR cylinder exhaust passage 116.

Figure 3A:
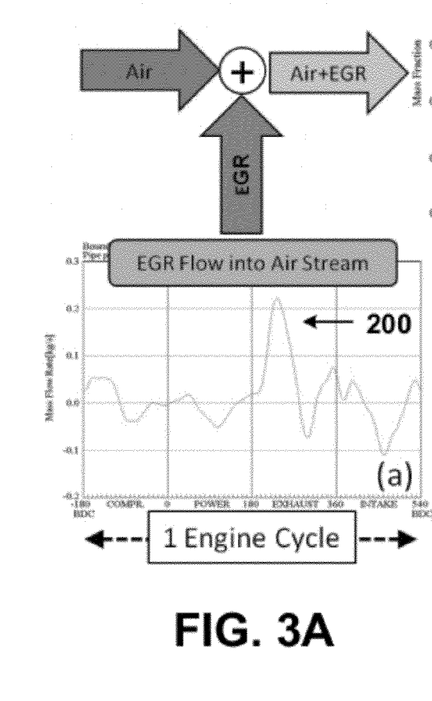
FIG. 3A is a schematic drawing showing variation of exhaust gas mass flow rate (kg/s) from a dedicated EGR cylinder of an engine during one operating cycle of the engine and prior to the exhaust gas being introduced to an intake stream of air.
Figures 3B, 3C:
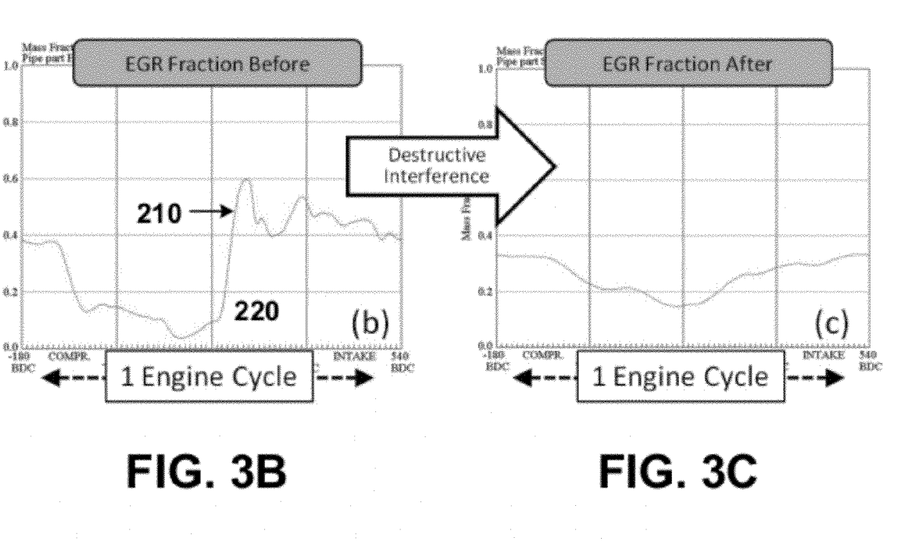
FIG. 3B is a schematic drawing showing variation of exhaust gas mass fraction in a stream of air during one operating cycle of an engine with a dedicated EGR cylinder without use of an apparatus according to the present disclosure.
FIG. 3C is a schematic drawing showing variation of exhaust gas mass fraction in a stream of air during one operating cycle of an engine with a dedicated EGR cylinder with use of an apparatus according to the present disclosure.

An example of the exhaust gas pulsations may be seen in FIG. 3A and FIG. 3B. FIG. 3A shows a pulsation 200 of exhaust gas 114 prior to exhaust gas 114 being introduced to air 102, while FIG. 3B shows a pulsation 210 of exhaust gas 114 within air/exhaust gas mixture 130 after exhaust gas 114 has been introduced to stream of air 102.

Consequently, when the pulsations 200 of exhaust gas 114 may be introduced to stream of air 102, the air/exhaust gas mixture 130 may have pulsations 210 of exhaust gas 114 therein resulting in variations unacceptable for control and tolerance of high EGR levels. For example, the air/exhaust gas mixture 130 may have a temporal distribution of exhaust gas 114 therein where, for a given length of the air intake passage 106, the concentration/distribution of the exhaust gas 114 may vary along the length in accordance with the exhaust gas pulsations. Similarly, the air/exhaust gas mixture 130 may have a radial distribution of exhaust gas 114 therein where, for a given cross-sectional area of the air intake passage 106, the concentration/distribution of the exhaust gas 114 may vary from the middle/center to the outer boundary of the passage in accordance with the exhaust gas pulsations.

Figure 4:
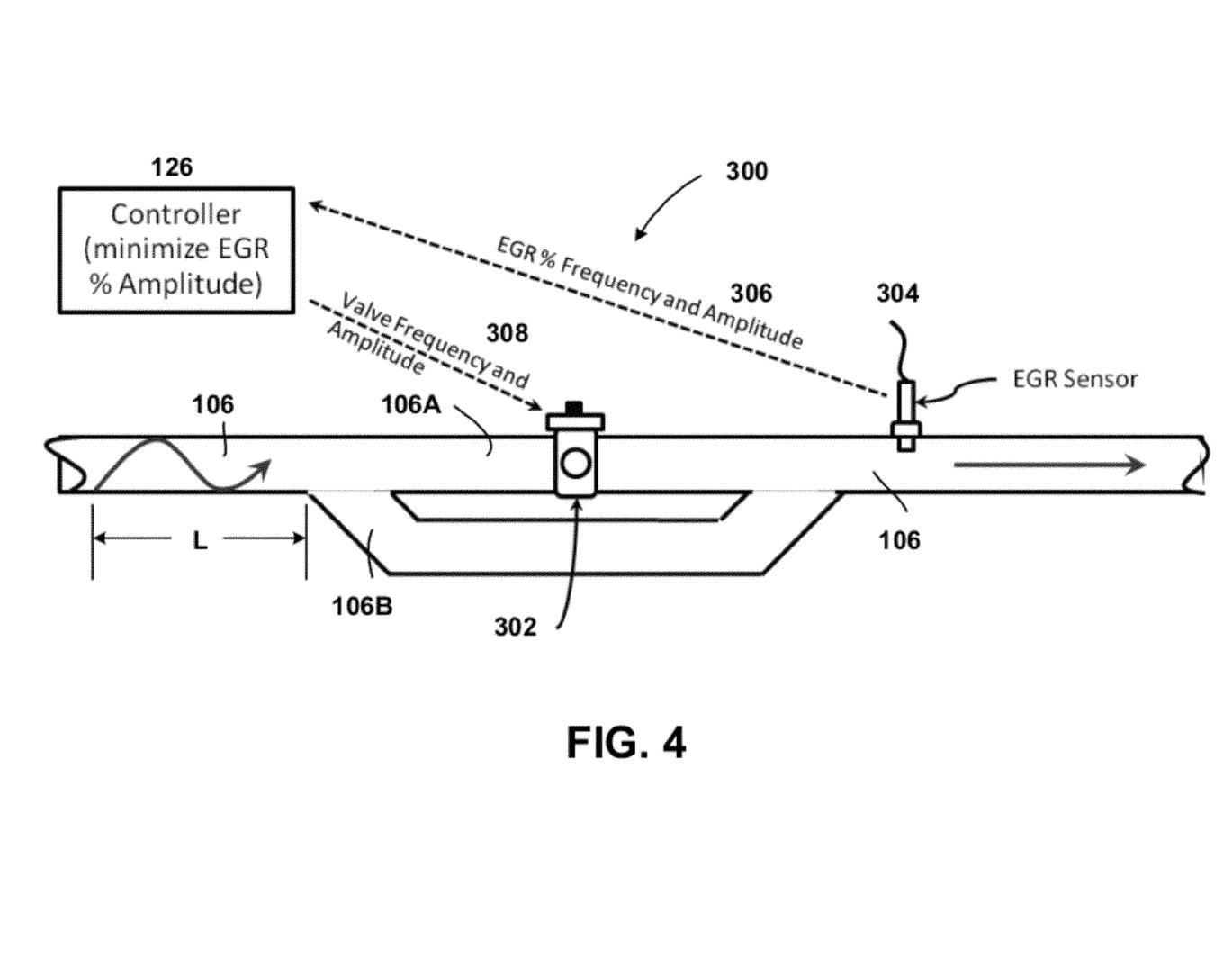
FIG. 4 is a schematic drawing of one embodiment of an apparatus according to the present disclosure, for an engine with a dedicated EGR cylinder, to reduce variation/increase distribution of exhaust gas mass fraction in an intake stream of air.

In order to decrease the variation and increase the distribution of the exhaust gas 114 within air/exhaust gas mixture 130, to better ensure that all of cylinders 150-156 receive a same dilution level of exhaust gas 114 mixed with air 102 during operation of engine 100, the intake system 110 may be equipped with a dampener/modulator 300 as shown in FIG. 4, which may be located between mixer 112 and intercooler 132.

After the exhaust gas 114 is introduced to the stream of ambient air 102, the temporal distribution of exhaust gas 114 in the air/exhaust gas mixture 130 may be calculated or directly measured with a fast response exhaust gas oxygen (EGO) sensor 304. As shown in FIG. 3B, the distribution of exhaust gas 114 in the air/exhaust gas mixture 130 may be considered to be poor due to the pulsed flow of the exhaust gas 114 entering the stream of air 102. As shown in FIG. 3B, exhaust gas distribution can be approximated as a periodic function 220, with the period of the function being one engine cycle.

At 100% volumetric efficiency, engine 100 may be understood to consume one cycle's worth of air/exhaust gas mixture 130. This consumed volume can be translated into an actual length L of intake passage 106 for a given intake passage diameter, with the length L of intake passage corresponding to one complete periodic distribution/wavelength of exhaust gas 114 in the air/exhaust gas mixture 130. From this, a ½ wavelength of the periodic distribution may be determined, which corresponds to ½ L.

With the foregoing information, the intake passage 106 may be split into two passages 106A and 106B for air/exhaust gas mixture 130, with passage 106B configured such that a stream of air/exhaust gas mixture 130 in passage 106B must travel ½ wavelength, or ½ L, further than a stream of air/exhaust gas mixture 130 in passage 106A before the two streams from passages 106A, 106B are rejoined downstream in passage 106 again.

In the foregoing manner, the peaks and troughs of the stream of air/exhaust gas mixture 130 in passages 106A, 106B may be superimposed in such fashion to cancel each other (superposition principle), with the peaks and troughs of the stream of air/exhaust gas mixture 130 in passage 106A theoretically being 180 degrees out of phase with the peaks and troughs of the stream of air/exhaust gas mixture 130 in passage 106B. Such a method of arranging the peaks and troughs of a time varying function to be superimposed in such fashion to cancel each other may be understood herein as destructive wave interference. With destructive wave interference, cancellation of two waves may begin to occur when the two waves are out of phase 90 degrees, and continue to increase until the waves are 180 degrees out of phase, at which point the waves may be understood to be completely out of phase. Thereafter, from 180 degrees to 270 degrees, the cancellation of the two waves may be understood to decrease.

Referring to FIG. 3C, the destructive interference concept may be shown to work in simulation to modulate and dampen the peaks and troughs (amplitude) of pulsations of exhaust gas 114 in air/exhaust gas mixture 130 as compared to FIG. 3B. More particularly, the absolute value of the displacement from peak to trough and the corresponding amplitude maximum value of the displacement of the exhaust gas oscillations shown in FIG. 3B have been reduced with destructive interference as shown in FIG. 3C.

Thus, the foregoing description provides methods and systems to manage exhaust gas 114 expelled from cylinders 150-156 of an internal combustion engine 100, with the method comprising operating at least one cylinder of the engine 100 as a dedicated exhaust gas recirculation (EGR) cylinder 156, and wherein substantially all the exhaust gas 114 is recirculated to an intake system 110 of the engine 100 and the exhaust gas 114 expelled from the dedicated EGR cylinder 156 is expelled in pulsations; introducing the pulsations of the exhaust gas 114 from the dedicated EGR cylinder 156 to a first flow passage 106A and a second flow passage 106B of an intake system 110; merging the pulsations of the exhaust gas 114 from the first and second flow passages 106A, 106B such that the pulsations from the flow passages 106A, 106B destructively interfere with one another; and introducing the exhaust gas 114 from the intake system 110 to all the cylinders 150-156 of the engine 100.

The foregoing description also provides an intake system 110 configured to reduce an amplitude of the pulsations of the exhaust gas expelled from the dedicated EGR cylinder, particularly by destructive wave interference.

It should be understood that in reducing the amplitude of the pulsations of the exhaust gas 114 expelled from the EGR cylinder 156, the present disclosure teaches reducing pulsations with respect to pressure, as well as reducing pulsations of exhaust gas concentration in air/exhaust gas mixture 130. In other words, the pulsations may be understood to include a pressure component and a exhaust gas concentration component. The destructive interference employed acts to reduce variation in pressure, as well as reduce variation in the temporal distribution of exhaust gas 114 in the in air/exhaust gas mixture 130. So in the same way pressure pulses can interact to ameliorate intake pressure pulsations, the disclosure does the same for EGR concentration fluctuations in the intake stream.

It should be understood that the foregoing method and system to manage the exhaust gas 114 recirculated to the intake system 110 of the engine 100 works passively at 100% volumetric efficiency. To manage the exhaust gas at other than 100% volumetric efficiency (e.g. engine operated at part load or when the ½ wavelength path is not tuned correctly), dampener/modulator 300 may include an actively controlled flow restrictor 302, such as an intake throttle valve configured to restrict the volumetric flow and amount (mass) of air/exhaust gas mixture 130 through passage 106A, thereby routing flow of the air/exhaust gas mixture 130 through passage 106B. For example, the flow restrictor 302 may operate to alternating introduction of the pulsations of the exhaust gas from the dedicated EGR cylinder 156 to the first flow passage 106A and the second flow passage 106B of the intake system 110.

During operation of dampener/modulator 300, the distribution of exhaust gas 114 in the air/exhaust gas mixture 130 may be calculated or directly measured with intake oxygen (EGO) sensor 304. Sensor 304 may then provide engine controller 126 with an input signal/feedback 306 representative of the exhaust gas distribution (e.g. amplitude and frequency) of the oscillating exhaust gas fraction measured thereby. In response, engine controller 126 may control an operation of flow restrictor 302 (e.g. opening and closing at a variable frequency and amplitude) to reduce, and more particularly minimize, variations in the distribution of exhaust gas 114 in the air/exhaust gas mixture 130 measured with sensor 304. For example, the engine controller 126 may provide an input signal/feedback 308 to flow restrictor 302 to actively adjust the flow restrictor's 302 amplitude and frequency (based on manifold pressure and engine speed) to minimize the measured exhaust gas amplitude. Thus engine controller 126 may receive feedback of the amplitude and frequency of the oscillating EGR fraction in the inlet stream, and control the frequency magnitude of an oscillating valve or orifice position to compensate with the purpose of improving the EGR distribution, and more particularly the temporal distribution.

While a preferred embodiment of the present invention(s) has been described, it should be understood that various changes, adaptations and modifications can be made therein without departing from the spirit of the invention(s) and the scope of the appended claims. The scope of the invention(s) should, therefore, be determined not with reference to the above description, but instead should be determined with reference to the appended claims along with their full scope of equivalents. Furthermore, it should be understood that the appended claims do not necessarily comprise the broadest scope of the invention(s) which the applicant is entitled to claim, or the only manner(s) in which the invention(s) may be claimed, or that all recited features are necessary.

What is claimed:

1. A method to manage exhaust gas expelled from an engine, the method comprising:
   providing an internal combustion engine having a plurality of cylinders including at least one dedicated exhaust gas recirculation (EGR) cylinder;
   providing fuel from a common fuel source to the plurality of cylinders including the dedicated EGR cylinder, wherein, during an operating cycle of the engine, the plurality of cylinders including the dedicated EGR cylinder each operate with the fuel being provided by a fuel injector and the dedicated EGR cylinder operates to recirculate exhaust gas;
   operating the at least one dedicated EGR cylinder, wherein 90% - 100% by volume of exhaust gas expelled from the dedicate EGR cylinder is recirculated to an intake system of the engine and the exhaust gas expelled from the dedicated EGR cylinder is expelled in pulsations;

introducing the pulsations of the exhaust gas from the dedicated EGR cylinder to a first flow passage and a second flow passage of an intake system, wherein the second flow passage splits from the first flow passage at a second flow passage entrance and rejoins with the first flow passage at a second flow passage exit;

merging the pulsations of the exhaust gas from the first and second flow passages such that the pulsations from the flow passages destructively interfere with one another;

introducing the exhaust gas from the intake system to all the cylinders of the engine;

wherein introducing the pulsations of the exhaust gas from the dedicated EGR cylinder to the first flow passage and the second flow passage is controlled at least in part by a flow restrictor;

wherein the flow restrictor is an actively controlled flow restrictor located in the first flow passage between the second flow passage entrance and the second flow passage exit; and wherein the actively controlled flow restrictor is operable to control volumetric flow through the first passage by an opening and a closing of the actively controlled flow restrictor based on engine speed.

2. The method of claim 1 wherein:
the exhaust gas expelled in pulsations from the dedicated EGR cylinder is introduced to a stream of air in the intake system prior to introducing the pulsations of the exhaust gas from the dedicated EGR cylinder to the first flow passage and the second flow passage of the intake system.

3. The method of claim 1 wherein:
the intake system is configured to reduce an amplitude of the pulsations of the exhaust gas expelled from the dedicated EGR cylinder.

4. The method of claim 3 wherein:
the intake system is configured to reduce the amplitude of the pulsations of the exhaust gas expelled from the dedicated EGR cylinder by destructive wave interference.

5. The method of claim 1 wherein:
merging the pulsations of the exhaust gas from the first and second flow passages such that the pulsations from the flow passages destructively interfere with one another further comprises merging the pulsations of the exhaust gas from the first and second flow passages such that the pulsations from the flow passages cancel one another.

6. The method of claim 1 wherein:
merging the pulsations of the exhaust gas from the first and second flow passages such that the pulsations from the flow passages destructively interfere with one another further comprises merging the pulsations of the exhaust gas from the first and second flow passages such that the pulsations from the flow passages are out of phase.

7. The method of claim 1 wherein:
the first flow passage and the second flow passage have different lengths.

8. The method of claim 1 wherein:
the exhaust gas expelled in pulsations from the dedicated EGR cylinder is introduced to a stream of air in the intake system prior to introducing the pulsations of the exhaust gas from the dedicated EGR cylinder to the first flow passage and the second flow passage of the intake system; and merging the pulsations of the exhaust gas from the first and second flow passages such that the pulsations from the flow passages destructively interfere with one another increases a distribution of the exhaust gas in the stream of air.

9. The method of claim 1 wherein:
introducing the pulsations of the exhaust gas from the dedicated EGR cylinder to the first flow passage and the second flow passage of the intake system further comprises alternating introduction of the pulsations of the exhaust gas from the dedicated EGR cylinder to the first flow passage and the second flow passage of the intake system.

10. The method of claim 1 wherein:
the actively controlled flow restrictor comprises a throttle valve operable by an engine controller.

11. The method of claim 1 further comprising:
sampling the exhaust gas in a common passage with an oxygen sensor downstream of the first and second flow passages for one or more components in the exhaust gas.

12. The method of claim 1 further comprising:
controlling a flow of the recirculated exhaust gas during operation of the engine with at least one flow restrictor, wherein the flow restrictor is configured and arranged to restrict a flow of the recirculated exhaust gas to the dedicated EGR cylinder without restricting a flow of the recirculated exhaust gas to the remaining cylinders of the engine.

* * * * *